United States Patent
Takimoto et al.

(10) Patent No.: US 9,333,724 B2
(45) Date of Patent: May 10, 2016

(54) GLASS FILM LAMINATE

(75) Inventors: Hiroshi Takimoto, Shiga (JP); Katsuhiro Taniguchi, Shiga (JP)

(73) Assignee: NIPPON ELECTRIC GLASS CO., LTD., Shiga (JP)

(*) Notice: Subject to any disclaimer, the term of this patent is extended or adjusted under 35 U.S.C. 154(b) by 394 days.

(21) Appl. No.: 13/192,639

(22) Filed: Jul. 28, 2011

(65) Prior Publication Data
US 2012/0135187 A1 May 31, 2012

(30) Foreign Application Priority Data

Jul. 28, 2010 (JP) ................... 2010-169853
Dec. 22, 2010 (JP) ................... 2010-285246

(51) Int. Cl.
| B32B 3/10 | (2006.01) |
|---|---|
| B32B 7/12 | (2006.01) |
| B32B 3/02 | (2006.01) |
| B32B 7/06 | (2006.01) |
| B32B 17/06 | (2006.01) |
| B32B 17/10 | (2006.01) |

(52) U.S. Cl.
CPC ... *B32B 7/12* (2013.01); *B32B 3/02* (2013.01); *B32B 7/06* (2013.01); *B32B 17/06* (2013.01); *B32B 17/10155* (2013.01); *B32B 17/10293* (2013.01); *Y10T 428/24273* (2015.01); *Y10T 428/24355* (2015.01); *Y10T 428/24479* (2015.01); *Y10T 428/24752* (2015.01)

(58) Field of Classification Search
USPC ........................................................ 428/192
See application file for complete search history.

(56) References Cited

U.S. PATENT DOCUMENTS

| 5,869,150 | A | 2/1999 | Iwamoto |
|---|---|---|---|
| 6,037,026 | A | 3/2000 | Iwamoto |
| 2003/0110804 | A1 | 6/2003 | Fenn et al. |
| 2008/0171209 | A1 | 7/2008 | Nishiyama |
| 2009/0110882 | A1* | 4/2009 | Higuchi ............... 428/138 |
| 2009/0314032 | A1 | 12/2009 | Tomamoto et al. |
| 2011/0045239 | A1* | 2/2011 | Takaya ............ B32B 3/02 428/138 |
| 2011/0123787 | A1 | 5/2011 | Tomamoto et al. |
| 2011/0177290 | A1* | 7/2011 | Tomamoto et al. ........ 428/142 |
| 2012/0080403 | A1* | 4/2012 | Tomamoto et al. .......... 216/34 |

FOREIGN PATENT DOCUMENTS

| CN | 1604875 | 4/2005 |
|---|---|---|
| CN | 101152972 | 4/2008 |
| EP | 2 077 254 | 7/2009 |
| EP | 2 450 323 | 5/2012 |

(Continued)

OTHER PUBLICATIONS

Machine translation of jp 2010-018505 retreived Mar. 19, 2015.*

(Continued)

*Primary Examiner* — David Sample
*Assistant Examiner* — Christopher Polley
(74) *Attorney, Agent, or Firm* — Wenderoth, Lind & Ponack, L.L.P.

(57) ABSTRACT

A glass film laminate includes a supporting member and a glass film laminated to each other. The supporting member protrudes from the glass film, and has a peeling start portion at which at least one corner portion of the glass film is exposed from the supporting member. The peeling start portion is provided with a distance from a side of the supporting member.

7 Claims, 9 Drawing Sheets

(56) References Cited

FOREIGN PATENT DOCUMENTS

| EP | 2 463 253 | 6/2012 |
| EP | 2 479 151 | 7/2012 |
| JP | 8-86993 | 4/1996 |
| JP | 2008-133174 | 6/2008 |
| JP | 2010-018505 | 1/2010 |
| JP | 2010-018505 A * | 1/2010 |
| TW | 200744965 | 12/2007 |
| WO | WO 2010038757 A1 * | 4/2010 |

OTHER PUBLICATIONS

International Preliminary Report on Patentability and Written Opinion of the International Searching Authority issued Feb. 14, 2013 in International (PCT) Application No. PCT/JP2011/067215.

International Search Report issued Nov. 15, 2011 in corresponding International (PCT) Application No. PCT/JP2011/067215.

Supplementary European Search Report issued Apr. 9, 2013 in corresponding European Patent Application No. 11812548.3.

Supplementary European Search Report dated Feb. 4, 2014 issued in corresponding European Application No. 13191656.1.

Chinese Office Action dated Mar. 5, 2014 in corresponding Chinese Application No. 201180010413.2 (with partial English translation).

Taiwanese Office Action and Search Report issued Jun. 23, 2015 in corresponding Taiwanese Application No. 100126794 (with partial English translation).

* cited by examiner

GLASS FILM LAMINATE

TECHNICAL FIELD

The present invention relates to a glass film laminate in which a glass film is supported with a supporting member, the glass film being to be used for a glass substrate for devices such as a flat panel display including a liquid crystal display and an OLED display, a solar cell, a lithium ion battery, a digital signage, a touch panel, and an electronic paper, a cover glass for devices such as an OLED lighting device, a package for a medicinal product, and the like.

BACKGROUND ART

From the viewpoint of space saving, in recent years, there have been widely used, in place of a CRT type display conventionally used, flat panel displays such as a liquid crystal display, a plasma display, an OLED display, and a field emission display. Further reduction in thickness is demanded for those flat panel displays. In particular, it is required that the OLED display be easily carried by being folded or rolled and be usable not only on a flat surface but also on a curved surface. Further, it is not just displays that are required to be usable not only on a flat surface but also on a curved surface. For example, if a solar cell or an OLED lighting device can be formed on a surface of an object having a curved surface, such as a surface of an automobile body, or a roof, a pillar, or an outer wall of a building, the applications of the solar cell or OLED lighting device may expand. Substrates and cover glasses to be used for those devices are therefore required to be a thinner sheet and to have high flexibility.

A light-emitting member to be used for an OLED display deteriorates in quality through the contact of gasses such as oxygen and water vapor. Thus, a substrate to be used for the OLED display is required to have high gas-barrier property, and hence the use of a glass substrate for the substrate is expected. However, glass to be used for a substrate is weak in tensile stress unlike a resin film, and hence is low in flexibility. Thus, when a glass substrate is made bend and thereby being generated a tensile stress on a surface of the glass substrate, the glass substrate tends to be damaged. In order to impart flexibility to the glass substrate, the glass substrate is required to achieve an ultra thin sheet. Thus, a glass film having a thickness of 200 μm or less is proposed as disclosed in Patent Literature 1 below.

A glass substrate to be used for electronic devices such as a flat panel display and a solar cell is subjected to various kinds of processing associated with electronic device manufacture, such as processing for providing a film such as a transparent conductive film and cleaning processing. However, when a glass film is used as a glass substrate for those electronic devices, the glass film is damaged due to a stress change even at a small amount, because glass is a brittle material. Thus, there is a problem in that the handling of the glass film is very difficult, when the above-mentioned various kinds of processing associated with electronic device manufacture are carried out. In addition, there is another problem in that a glass film having a thickness of 200 μm or less is rich in flexibility, and hence the positioning of the glass film is difficult when the processing associated with manufacture is carried out.

Therefore, in order to improve a handling property of the glass film, there is proposed a laminate disclosed in Patent Literature 2 below. Patent Literature 2 below proposes a laminate in which a supporting glass substrate and a glass sheet are laminated through intermediation of a pressure-sensitive adhesive layer that may be maintained almost stably even after its repeated use. According to this kind of laminate, even when a glass sheet itself having less strength and rigidity is used, a liquid crystal display device can be manufactured while sharing a conventional liquid crystal display device manufacturing line. Also, after completion of the manufacturing steps, the glass substrate can be peeled off. Further, because the supporting member is used, the positioning can be easily performed when the processing associated with manufacture is carried out.

However, when the glass sheet is further ultra thinned to become a glass film, even in the above-mentioned laminate, it is difficult to peel off the glass film from the supporting glass substrate after the electronic device is manufactured. When the glass film is to be peeled from the supporting glass substrate, the peeling is started from a corner portion of the glass film. However, in the laminate described in Patent Literature 2, the entire surface of the glass film is brought into contact with the supporting glass substrate. Therefore, there is a problem in that, because the corner portion of the glass film is difficult to grasp, breaking or chipping are liable to occur at the corner portion of the glass film during peeling of the glass film. In particular, when a strong adhesive force is present between the glass film and the supporting glass, this problem becomes conspicuous. In order to solve this problem, the glass film may be laminated on the supporting glass substrate so that a part of the glass film protrudes from the supporting glass substrate. However, in this case, there is a problem in that, when a pin or the like strikes the laminate at the time of positioning, the part of the glass film protruding from the supporting glass substrate may be broken.

In order to solve the above-mentioned problem, Patent Literature 3 below disclosed a glass laminate constituted by a thin glass substrate and a supporting glass substrate which is provided with recessed portions at an end portion thereof. An end portion of the thin glass substrate exposed at the recessed portions can be grasped, and therefore the thin glass substrate can be prevented from breaking when peeling. Further, the supporting glass substrate is a size larger than the thin glass substrate, and hence the breaking of the thin glass substrate due to the striking of the pin or the like at the time of positioning can also be prevented to some extent.

CITATION LIST

Patent Literature 1: JP 2008-133174 A
Patent Literature 2: JP 08-86993 A
Patent Literature 3: JP 2010-18505 A

SUMMARY OF INVENTION

Technical Problems

However, in the invention described in Patent Literature 3, not all sides of the thin glass substrate are protected by the supporting glass substrate. That is, the thin glass substrate is exposed from the end portion of the supporting glass substrate at the recessed portions, and hence when an obstacle of any kind strikes the recessed portion, the thin glass substrate is directly struck. Therefore, there arises a problem in that the thin glass substrate is broken.

The present invention has been made to solve the problems in the prior arts as described above, and has an object to provide a glass film laminate capable of appropriately protecting a glass film by a supporting member, and also capable of peeling the glass film from the supporting member easily.

Solution to Problems

In order to achieve the above-mentioned object, the present invention provides a glass film laminate, comprising a supporting member and a glass film laminated to each other, wherein the supporting member protrudes from the glass film, and the supporting member comprises a peeling start portion at which at least one corner portion of the glass film is exposed from the supporting member, the peeling start portion being provided with a distance from a side of the supporting member.

In the above-mentioned structure, it is preferred that the peeling start portion have a circular shape with a diameter of 1 to 30 mm.

In the above-mentioned structure, it is preferred that an area of the glass film exposed at the peeling start portion is 0.19 mm$^2$ to 400 mm$^2$.

In the above-mentioned structure, it is preferred that the peeling start portion comprise a through hole.

Further, in order to achieve the above-mentioned object, the present invention provides a glass film laminate, comprising a supporting member and a glass film laminated to each other, wherein the supporting member protrudes from the glass film, the supporting member comprises a thin portion at which a thickness of the supporting member is partially reduced, the thin portion being provided at a side portion of the supporting member, and at least a part of a side of the glass film is distanced from the supporting member above the thin portion.

In the above-mentioned structure, it is preferred that the thin portion be provided so that at least one corner portion of the glass film is distanced from the supporting member.

In the above-mentioned structure, it is preferred that the glass film be distanced from the supporting member within a width of 0.5 to 15 mm from the side of the glass film.

In the above-mentioned structure, it is preferred that a distance between the glass film and the supporting member at the thin portion be 0.01 mm or more.

In the above-mentioned structure, it is preferred that the supporting member be a supporting glass.

In the above-mentioned structure, it is preferred that surfaces of the glass film and the supporting glass which brought into contact with each other each have a surface roughness (Ra) of 2.0 nm or less respectively.

In the above-mentioned structure, it is preferred that the glass film and the supporting glass be each formed by an overflow downdraw method.

In the above-mentioned structure, it is preferred that the glass film have a thickness of 300 μm or less.

Advantageous Effects of Invention

According to the present invention, the supporting member protrudes from the glass film, and hence the glass film can be appropriately protected. Even when any object such as a positioning pin or an unexpected obstacle strikes the glass film laminate from the side surface thereof, the object directly strikes the supporting member, and does not directly strike the glass film. In this manner, the glass film can be prevented from being damaged. Further, the peeling start portion at which at least one corner portion of the glass film is exposed from the supporting member is provided to the supporting member. Therefore, the corner portion of the glass film can be easily grasped from the peeling start portion, and hence the glass film can be effectively prevented from being damaged when the glass film is peeled. Further, the peeling start portion is provided with a distance from the side of the supporting member. Therefore, the glass film is not exposed outward from the side of the supporting member, and hence the glass film can be appropriately protected.

When the peeling start portion has a circular shape with a diameter of 1 to 30 mm, it is possible to reduce influence on the supporting member caused by providing the peeling start portion. When a brittle material is used for the supporting member, the peeling start portion is easier to be formed into a circular shape.

When the area of the glass film exposed at the peeling start portion ranges from 0.19 mm$^2$ to 400 mm$^2$, it is possible to reduce influence caused by exposing the glass film from the supporting member.

When the peeling start portion is a through hole, the glass film can be lifted by inserting a bar-like member from a rear surface of the supporting member, which makes it easier to grasp the corner portion of the glass film. Further, it is possible to easily form the peeling start portion in the supporting member with a drill or the like.

Further, with the structure in which the thin portion is provided at the side portion of the supporting member and at least a part of the side of the glass film is distanced from the supporting member above the thin portion, the glass film can be easily grasped from the thin portion, and hence the glass film can be effectively prevented from being damaged when the glass film is peeled. Further, the thin portion is structured so that the side portion of the supporting member is partially thinned. In this manner, the glass film is not exposed outward from the side of the supporting member, and hence the glass film can be appropriately protected.

When the thin portion is provided so that at least one corner portion of the glass film is distanced from the supporting member, it is possible to easily grasp the corner portion of the glass film from the thin portion, and hence the glass film can be effectively prevented from being damaged when the glass film is peeled.

When the glass film is distanced from the supporting member within a width of 0.5 to 15 mm from the side of the glass film, the glass film can be easily grasped, and it is possible to reduce influence of, for example, bending down of the glass film due to a distance between the glass film and the supporting member.

When the distance between the glass film and the supporting member at the thin portion is 0.01 mm or more, the glass film can be easily peeled from the supporting member by inserting a peel-off sheet such as a resin film from the clearance between the supporting member and the glass film existing above the thin portion.

In the above-mentioned structure, when the supporting member is a supporting glass, thermal expansion coefficients of the glass film and the supporting glass can be easily matched to each other, and it is possible to form a glass film laminate in which thermal warpage, cracking, or the like is less liable occur, even when thermal treatment is performed when the processing associated with manufacture is carried out.

In the above-mentioned structure, when the surfaces of the glass film and the supporting glass which brought into contact with each other each have a surface roughness Ra of 2.0 nm or less, the glass film and the supporting glass are brought into contact with each other at the smooth surfaces thereof to have a good contactness. Therefore, it is possible to laminate the glass film and the supporting glass firmly and stably without use of an adhesive.

In the above-mentioned structure, when each of the glass film and the supporting glass is formed by an overflow downdraw method, it is possible to obtain glass having extremely high surface accuracy without a polishing step. With this, it is possible to laminate the glass film and the supporting glass more firmly.

According to the present invention, even a ultra thin glass sheet having a thickness of 300 μm or less, in which cracking, chipping, and the like are liable to occur at the corner portion, can be easily peeled from the supporting member.

DESCRIPTION OF EMBODIMENTS

Hereinafter, glass film laminates according to preferred embodiments of the present invention are described with reference to the drawings.

Figure 1:
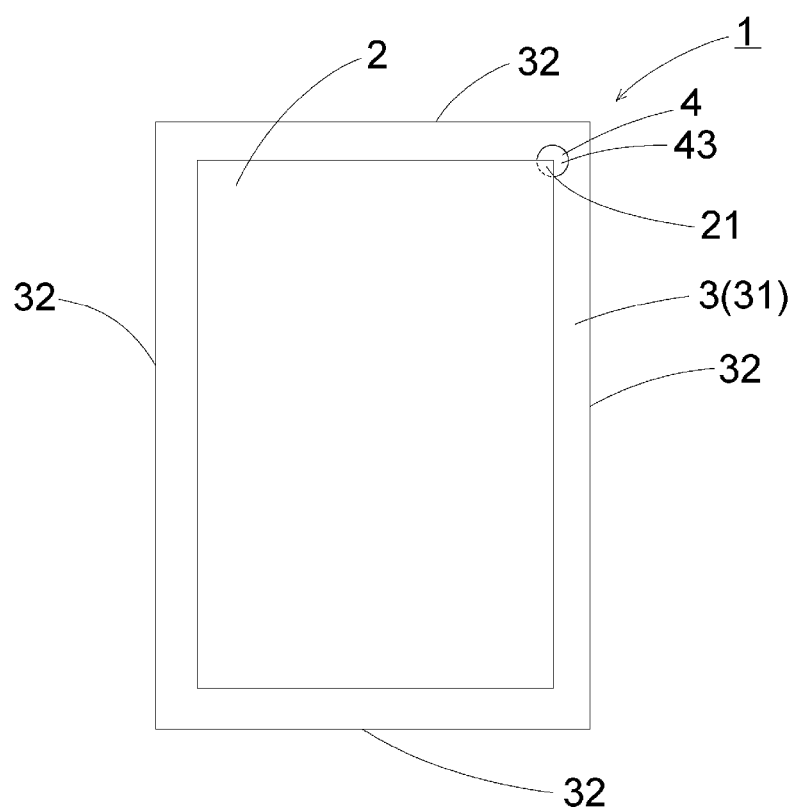
FIG. 1 is a plan view of a glass film laminate according to the present invention.

As illustrated in FIG. 1, a glass film laminate (1) according to the present invention comprises a glass film (2) and a supporting member (3), and in the supporting member (3), a peeling start portion (4) is provided.

As a material for the glass film (2), silicate glass is used, silica glass or borosilicate glass is preferably used, or alkali-free glass is most preferably used. If the glass film (2) contains an alkali component, a cation is detached from a surface of the glass film, leading to occurrence of a so-called too-abundant soda phenomenon and resulting in a coarse structure. In this case, if the glass film (2) is continuously used in a bent state, the glass film (2) may be damaged at a portion whose structure has become course because of aging degradation. Note that, the alkali-free glass is a glass substantially free of an alkali component (alkali metal oxide), and specifically, a glass that contains the alkali component at a weight ratio of 1000 ppm or less. The weight ratio of the alkali component in the present invention is preferably 500 ppm or less, more preferably 300 ppm or less.

The glass film (2) has a thickness of preferably 300 μm or less, more preferably 5 μm to 200 μm, most preferably 5 μm to 100 μm. Even a ultra thin glass sheet having a thickness of 300 μm or less, in which cracking, chipping, and the like are liable to occur at the corner portion, can be easily peeled from the supporting member. Further, processing associated with manufacture can be easily carried out with respect to the glass film (2), which is hard to handle and easily causes problems such as a positioning error and displacement in patterning. If the thickness is smaller than 5 μm, the glass film (2) tends to have insufficient strength. As a result, when the glass film (2) is peeled from the glass film laminate (1) to be incorporated into a device, the glass film (2) becomes liable to be damaged.

The supporting member (3) is for supporting the glass film (2), and in order to protect end portions of the glass film (2), the supporting member (3) protrudes from the glass film (2). The amount of protrusion of the supporting member (3) is preferably 5 mm to 20 mm. When the amount of protrusion of the supporting member (3) is smaller than 5 mm, there is a possibility in that it becomes difficult to form the peeling start portion (4) in the supporting member (3) with a distance from a side (32). On the other hand, when the amount of protrusion of the supporting member (3) is more than 20 mm, the area of the glass film (2) occupying the supporting member (3) reduces, and hence there is a possibility in that the production efficiency is deteriorated.

As long as the supporting member (3) can support the glass film (2), the material for the supporting member (3) is not particularly limited, and there may be used a synthetic resin sheet, a natural resin sheet, a wood sheet, a metal sheet, a glass sheet, a ceramics sheet, and the like. Further, the thickness of the supporting member (3) is also not particularly limited. When the supporting member (3) is required to have a rigidity, there may be used, for example, a thick resin sheet or glass sheet. On the other hand, when the supporting member (3) is not required to have a rigidity and aimed at improving handling of the glass film (2), there may be used a resin film such as a PET film.

As the supporting member (3), a supporting glass (31) is preferred to be used. With this, thermal expansion coefficients of the glass film (2) and the supporting glass (31) can be easily matched, and it is possible to form a glass film laminate in which thermal warpage, cracking, or the like is less liable to occur, even when thermal treatment is performed during processing associated with manufacture. As for the supporting glass (31), it is preferred to use a glass having a difference in thermal expansion coefficients with the glass film (2) over 30 to 380° C. falling within $5 \times 10^{-7}$/° C. For the supporting glass (31), similarly to the glass film (2), silicate glass, silica glass, borosilicate glass, or alkali-free glass may be used. It is further preferred that the same glass be used for the supporting glass (31) and the glass film (2).

The supporting glass (31) is preferred to have a thickness of 400 μm or more. This is because when the supporting glass

(31) has a thickness smaller than 400 µm, there is a possibility in that the supporting glass (31) may have a problem in strength when the supporting glass (31) is handled alone. The supporting glass (31) preferably has a thickness of 400 µm to 700 µm, most preferably 500 µm to 700 µm. With this, the glass film (2) can be reliably supported, and it becomes possible to effectively suppress a damage that may occur when the glass film (2) is peeled from the supporting glass (31).

It is preferred that a surface roughness Ra of each of the surfaces of the glass film (2) and the supporting glass (31) which brought into contact with each other be 2.0 nm or less. With this, the glass film (2) and the supporting glass (31) are brought into contact with each other at the smooth surfaces thereof to have a good contactness. Therefore, it is possible to laminate the glass film and the supporting glass firmly and stably without use of an adhesive. The surfaces of the glass film (2) and supporting glass (31) each have the surface roughness Ra of preferably 1.0 nm or less, more preferably 0.5 nm or less, most preferably 0.2 nm or less.

It is preferred that a GI value of each of the surfaces of the glass film (2) and the supporting glass (31) which brought into contact with each other be 1000 pcs/m$^2$ or less. With this, the contact surfaces of the glass film (2) and the supporting glass (31) are clean, and hence the activity of the surfaces is not deteriorated. Therefore, it is possible to laminate the glass film (2) and the supporting glass (31) more firmly and stably without use of an adhesive. The GI value herein refers to the number (pcs) of impure particles having a longitudinal diameter of 1 µm or more and existing in a region of 1 m$^2$. The surfaces of the glass film (2) and supporting glass (31) each have the GI value of more preferably 500 pcs/m$^2$ or less, most preferably 100 pcs/m$^2$ or less.

Figure 2:
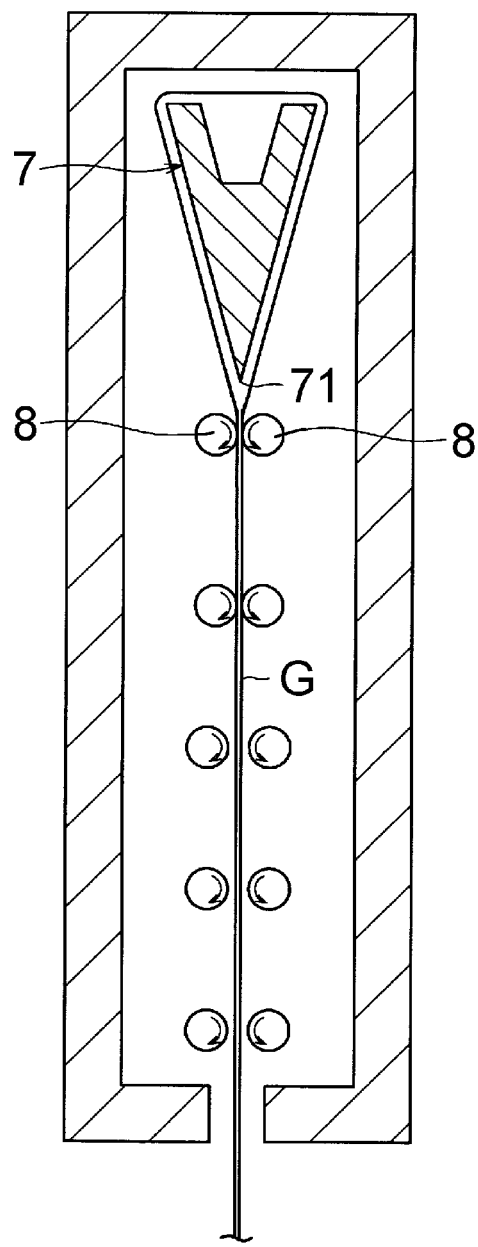
FIG. 2 is an explanatory view of a manufacturing device for a glass film and a supporting glass.

The glass film (2) and the supporting glass (31) to be used in the present invention are preferred to be formed by a downdraw method. This is because the glass film (2) and the supporting glass (31) can be formed to have smoother surfaces. In particular, an overflow downdraw method illustrated in FIG. 2 is a forming method in which both surfaces of a glass sheet are not brought into contact with a forming member during a formation process, and hence flaws are less liable to be generated on both the surfaces (translucent surfaces) of the obtained glass sheet, and thus high surface-quality can be obtained without polishing process. With this, it is possible to laminate the glass film (2) and the supporting glass (31) more firmly.

A glass ribbon (G) immediately after being flown downward from a lower end portion (71) of a forming member (7) having a wedge shape in cross section is drawn downwardly with its shrinkage in a width direction being restricted by cooling rollers (8), to thereby be thinned to have a predetermined thickness. Next, the glass ribbon (G) having reached to the predetermined thickness is annealed in an annealer to remove heat strain in the glass ribbon (G), followed by cutting of the glass ribbon (G) into pieces having a predetermined dimension. As a result, a glass sheet serving as the glass film (2) or the supporting glass (31) is formed.

The peeling start portion (4) is provided in the supporting member (3) with a distance from the side (32). With this, the supporting member (3) can be laminated while protruding from the glass film (2), and further, can be laminated so that a corner portion (21) of the glass film (2) is exposed at the peeling start portion (4). Specifically, the peeling start portion (4) is preferred to be provided in the vicinity of one of four corners of the supporting member (3).

In FIG. 1, the peeling start portion (4) is provided for one corner portion (21) of the glass film (2), but may be provided for two or more corner portions (21).

Figure 3A:
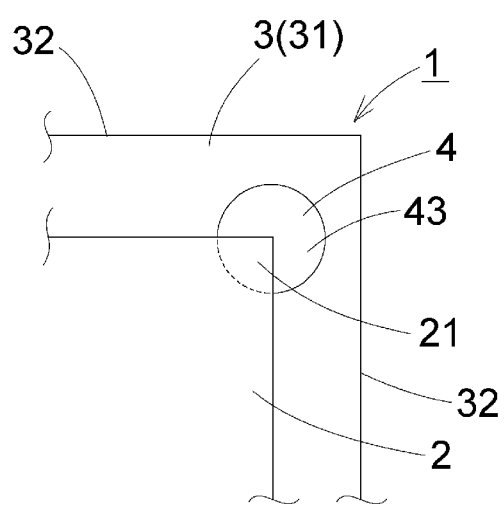
FIG. 3(a) is an enlarged plan view of the glass film laminate according to the present invention in the vicinity of a peeling start portion, illustrating an example in which the peeling start portion is formed into a circular shape in plan view.
Figure 3B:
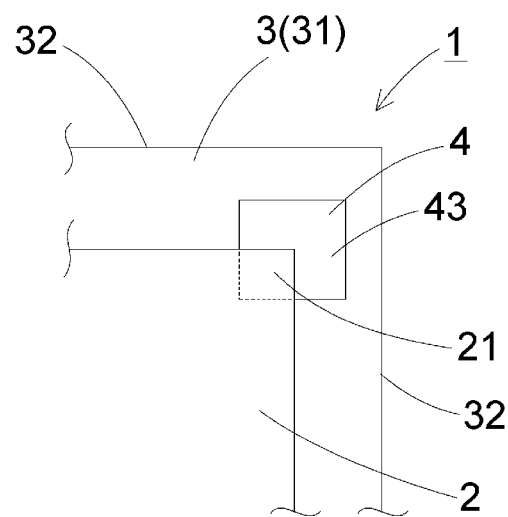
FIG. 3(b) is an enlarged plan view of the glass film laminate according to the present invention in the vicinity of the peeling start portion, illustrating an example in which the peeling start portion is formed into a rectangular shape in plan view.

The peeling start portion (4) is preferred to have, as illustrated in FIG. 3(a), a circular shape in plan view. When the shape of the peeling start portion (4) is a circle, the peeling start portion (4) can be easily formed with a well-known drill. Further, it is also possible to form the circular peeling start portion (4) by sandblasting, etching, and the like. The shape of the peeling start portion (4) is not limited to a circle as illustrated in FIG. 3(a), and may be, as illustrated in FIG. 3(b), a rectangle in plan view. A rectangular peeling start portion (4) can similarly be formed by sandblasting, etching, and the like. Further, in particular, when a resin material having toughness such as PET is used for the supporting member (3), the rectangular shape can be easily formed as illustrated in FIG. 3(b) by punching. A method of forming the peeling start portion (4) is not particularly limited, and the peeling start portion (4) may be formed by processing the supporting member (3) after the supporting member (3) is formed as described above, or may be formed simultaneously when the supporting member (3) is formed.

The peeling start portion (4) is preferred to have a circular shape with a diameter of 1 to 30 mm. With this, it is possible to reduce influence on the supporting member (3) caused by providing the peeling start portion (4). In a case where the diameter is smaller than 1 mm, there is a possibility in that it becomes difficult to grasp the glass film (2), when the glass film (2) is to be peeled from the supporting member (3), and in a case where the diameter is larger than 30 mm, there is a possibility in that the strength of the supporting member (3) becomes lower.

The glass film (2) is preferred to be exposed from the peeling start portion (4) by an area of 0.19 mm$^2$ to 400 mm$^2$. With this, it is possible to reduce influence on the glass film (2) caused by exposing the glass film (2) from the supporting member (3). In a case where the area of the glass film (2) exposed from the peeling start portion (4) is smaller than 0.19 mm$^2$, there is a possibility in that it becomes difficult to grasp the corner portion (21) of the glass film (2), when the glass film (2) is to be peeled. Further, in a case where the area of the glass film (2) exposed from the peeling start portion (4) is larger than 400 mm$^2$, there is a possibility in that the corner portion (21) of the glass film (2) is distorted in the peeling start portion (4), and the glass film (2) is damaged.

Figure 4A:
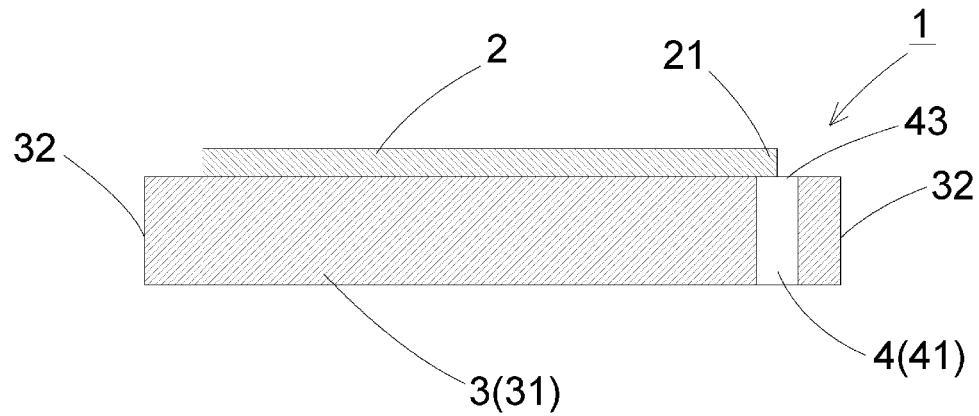
FIG. 4(a) is a sectional view of the glass film laminate according to the present invention, illustrating an example in which the peeling start portion is in a form of a through hole.
Figure 4B:
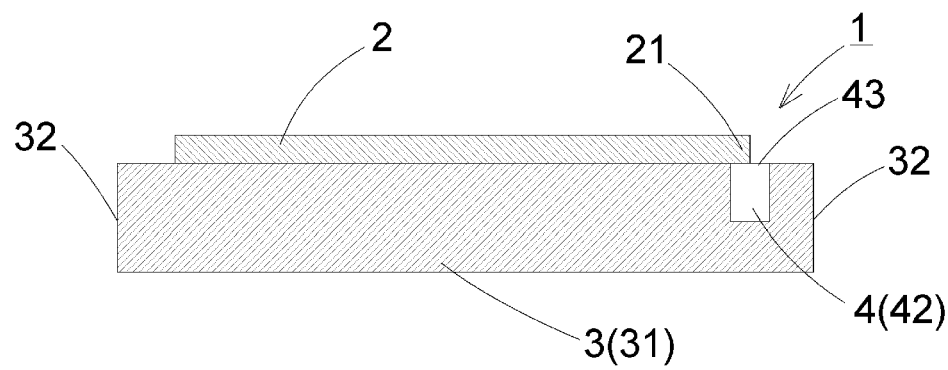
FIG. 4(b) is a sectional view of the glass film laminate according to the present invention, illustrating an example in which the peeling start portion is in a form of a depressed hole.

The peeling start portion (4) is preferred to be, as illustrated in FIG. 4(a), a through hole (41) provided in the supporting member (3) with a distance from the side (32). In this case, for example, by inserting a bar-like member from a rear surface of the supporting member (3), the corner portion (21) of the glass film (2) can be lifted, which makes it easier to grasp the corner portion (21). Further, it is possible to easily form the through hole (41) in the supporting member (3) with a drill or the like. Further, the peeling start portion (4) may be, as illustrated in FIG. 4(b), a depressed hole (42). With this, it is possible to easily transfer the glass film laminate (1) by causing the glass film laminate (1) to float by air or the like. Further, in the case of the through hole (41), when the area of the glass film (2) exposed from the peeling start portion (4) is increased, the corner portion (21) of the glass film (2) is distorted toward inside of the through hole (41). Therefore, the corner portion (21) of the glass film (2) may pass through the through hole (41) to be brought into contact with a transfer surface for the glass film laminate (1), and hence there is a possibility in that the glass film (2) is damaged during the transfer of the glass film laminate (1). On the other hand, in the case of the depressed hole (42), even when the peeling start portion (4) is provided large in order to ensure a grasping portion, the corner portion (21) of the glass film (2) is not brought into contact with the transfer surface, and hence it is possible to transfer the glass film laminate (1) more securely.

Figure 4C:
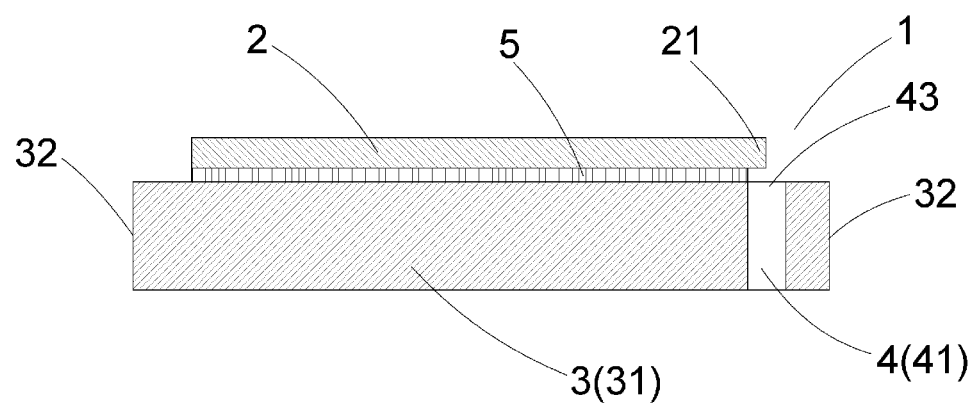
FIG. 4(c) is a sectional view of the glass film laminate according to the present invention, illustrating an example in which an adhesive layer is provided between a supporting member and the glass film.

When the glass film laminate (1) is manufactured by laminating the supporting member (3) and the glass film (2) to each other, as illustrated in FIG. 4(c), an adhesive layer (5) may be interposed between the glass film (2) and the supporting member (3). The glass film (2) is finally peeled off, and hence an adhesive having slight adhesion is preferably used for the adhesive layer (5). Specifically, the adhesive layer (5) preferably has an adhesive force of 0.002 to 2.00 N/25 mm, more preferably 0.005 to 1.00 N/25 mm, most preferably 0.01 to 0.7 N/25 mm.

After processing associated with manufacture, such as film formation, cleaning, and patterning, is carried out with respect to the glass film laminate (1) according to the present invention, the glass film (2) is peeled, starting from the peeling start portion (4). When the peeling is performed, the corner portion (21) of the glass film (2) is grasped with a finger or a grasping tool such as tweezers from a clearance (43) between the glass film (2) and the peeling start portion (4), and then the glass film (2) is peeled from the supporting member (3). Alternatively, a resin film such as a PET film may be inserted between the glass film (2) and the supporting member (3) from the clearance (43), and with the corner portion (21) as a beginning end, the glass film (2) may be gradually lifted, to thereby peel off the glass film (2) from the supporting member (3). In the case where a resin film having flexibility is used for the supporting member (3), by folding the supporting member (3) in the vicinity of the peeling start portion (4), the corner portion (21) of the glass film (2) can be easily grasped. The glass film (2) after being peeled off is incorporated into an electronic device or the like for various applications (for example, as a glass substrate for the electronic device).

Figure 5:
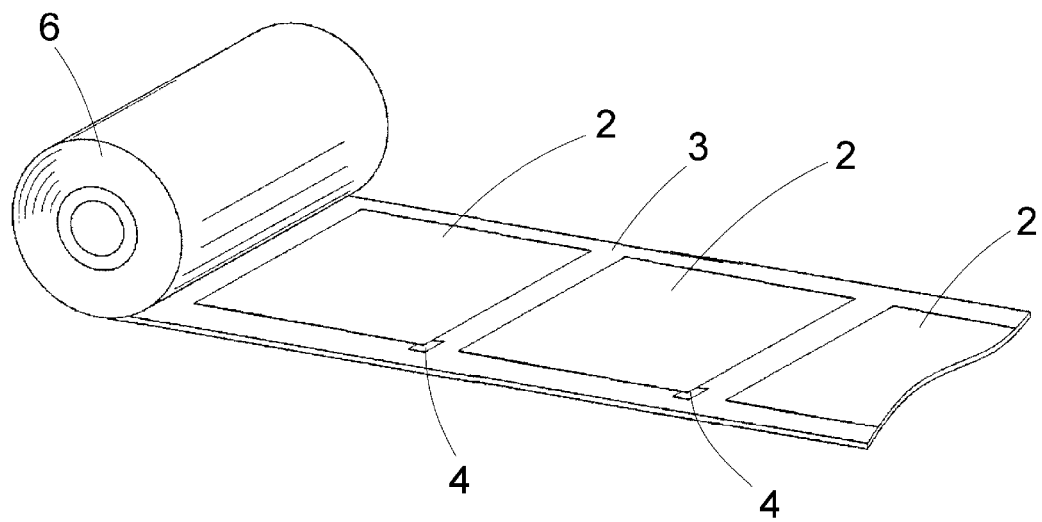
FIG. 5 is a view of a glass film laminate according to another embodiment of the present invention.
Figure 6:
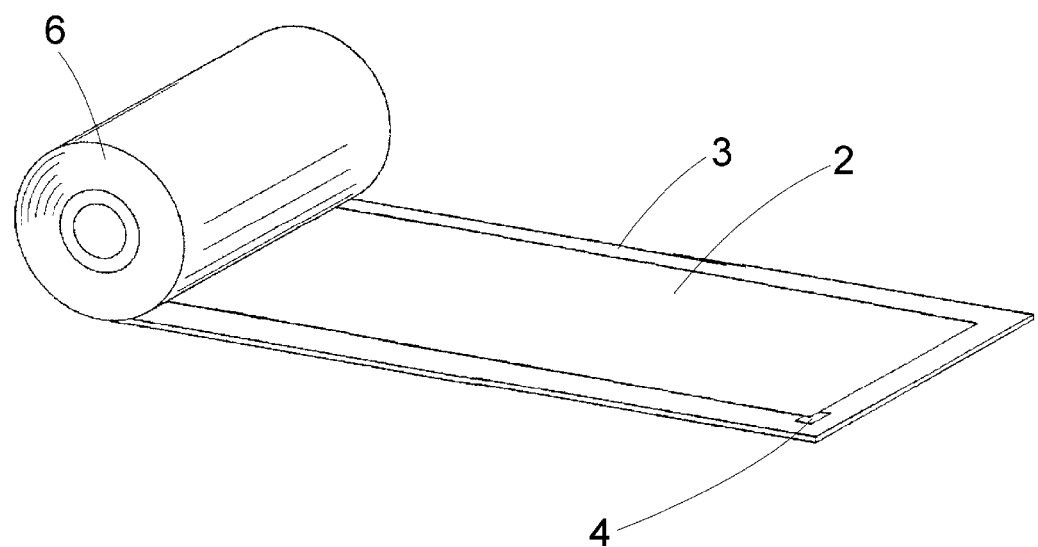
FIG. 6 is a view of a glass film laminate according to another embodiment of the present invention.

FIGS. 5 and 6 illustrate the glass film laminate (1) according to another embodiment of the present invention. In FIG. 5, the glass films (2) are intermittently laminated at predetermined lengths on the elongated supporting member (3) made of a resin film (PET film or the like), and the glass film laminate (1) is rolled to form a roll (6). With this, the transport efficiency of the glass film laminate (1) can be improved. Further, by employing a roll-to-roll process, the processing associated with the manufacture can be performed more efficiently. At least one corner portion (21) of each of the glass films (2) is provided with the peeling start portion (4). As illustrated in FIG. 6, the glass film (2) may be continuously laminated on the supporting member (3).

Hereinafter, glass film laminates according to further embodiments of the present invention are described. Note that, in the following description, only features of those embodiments are described, and overlapping explanations with the above-mentioned embodiments are omitted. The material, the thickness, the surface roughness Ra, the GI value of the surface, the forming method, and other matters concerning the glass film (2) and the supporting member (3) may be determined according to the above-mentioned embodiments.

Figure 7A:
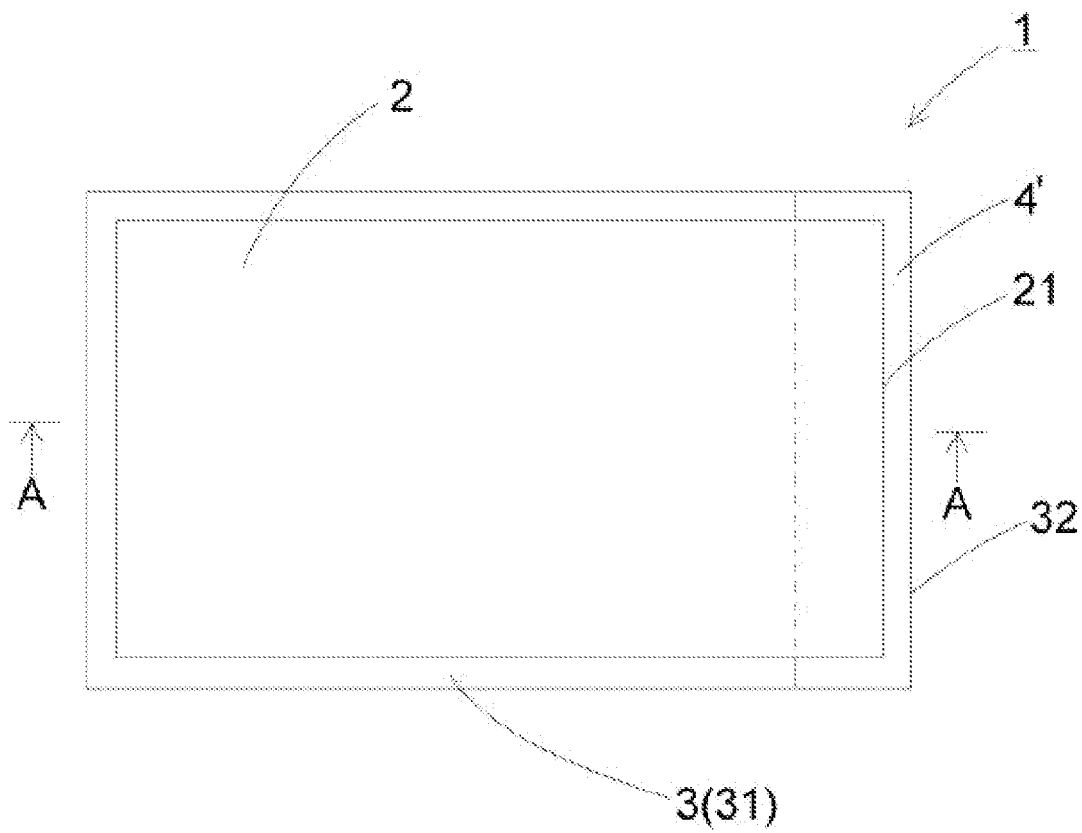
FIG. 7(a) is a plan view of a glass film laminate according to the present invention.

As illustrated in FIG. 7, a glass film laminate (1) according to the present invention comprises a glass film (2) and a supporting member (3), and on a side portion including a side (32) of the supporting member (3), a thin portion (4') is provided.

The supporting member (3) is for supporting member the glass film (2), and in order to protect end portions of the glass film (2), the supporting member (3) protrudes from the glass film (2). The amount of protrusion of the supporting member (3) is preferably 1 mm to 20 mm. When the amount of protrusion of the supporting member (3) is smaller than 1 mm, there is a possibility in that it becomes difficult to form the thin portion (4') at the side portion of the supporting member (3). On the other hand, when the amount of protrusion of the supporting member (3) is more than 20 mm, the area of the glass film (2) occupying the supporting member (3) reduces, and hence there is a possibility in that the production efficiency is deteriorated.

The thin portion (4') is provided at the side portion including the side (32) of the supporting member (3) in a state in which a surface on the glass film (2) side is partially thinned. With this, at least a part of a side portion (21) of the glass film (2) is distanced from the supporting member (3) above the thin portion (4') with a clearance (41') therebetween. Therefore, the side (21) of the glass film (2) distanced from the thin portion (4') can be easily grasped, and the glass film (2) can be effectively prevented from being damaged when the glass film (2) is peeled. Further, the thin portion (4') is partially thinned only at a surface on the glass film (2) side, and hence the glass film (2) is not exposed outward from the side (32) of the supporting member (3), with the result that the glass film (2) can be appropriately protected.

Figure 8A:
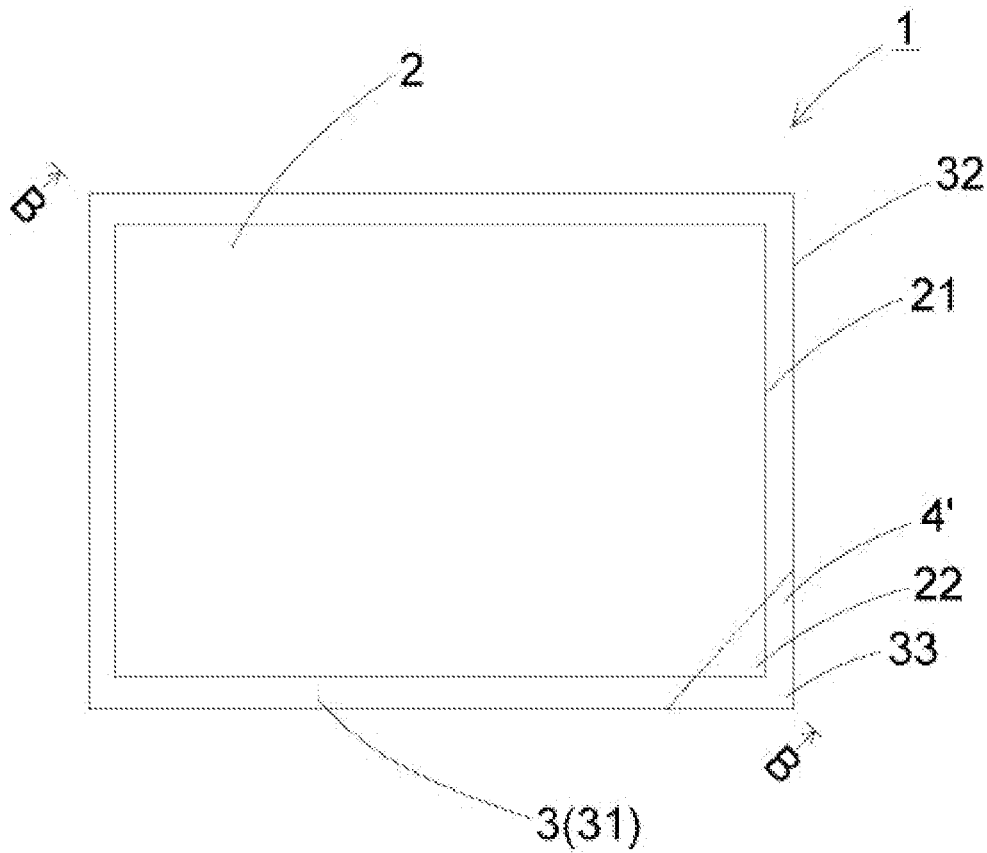
FIG. 8(a) is a plan view of the glass film laminate according to another embodiment of the present invention.

The thin portion (4') is preferred to be provided so that, as illustrated in FIG. 8, at least one corner portion (22) of the glass film (2) is distanced from the supporting member (3). With this, the corner portion (22) of the glass film (2) can be easily grasped from the thin portion (4'), and the glass film (2) can be effectively prevented from being damaged when the glass film (2) is peeled. Specifically, the thin portion (4') is preferred to be provided at a corner portion (33) of the supporting member (3). Note that, in FIG. 8, the thin portion (4') is provided so that one corner portion (22) of the glass film (2) is distanced from the supporting member (3), but the provision of the thin portion (4') is not limited thereto. The thin portion (4') may be provided at two or more corner portions (33) of the supporting member (3).

Figure 7B:
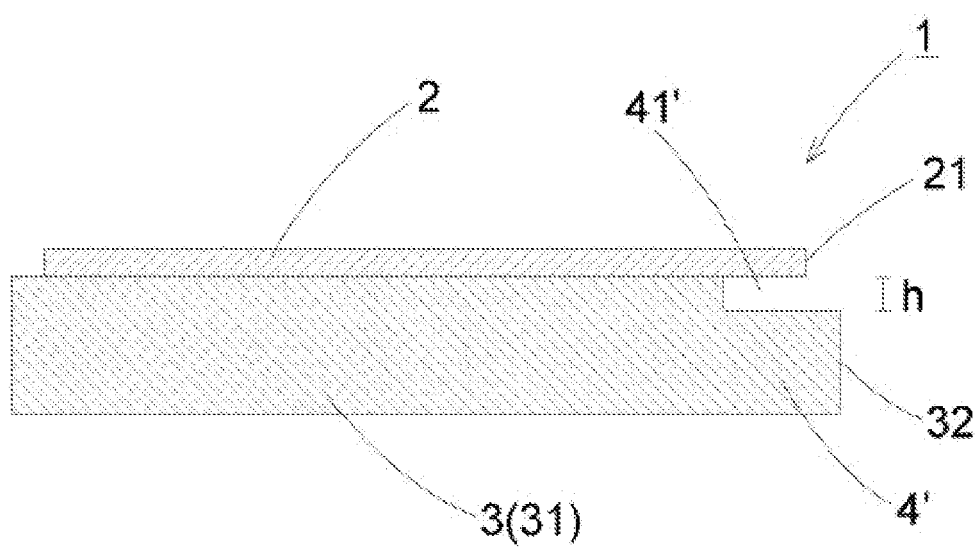
FIG. 7(b) is a sectional view taken along the line A-A of FIG. 7(a).
Figure 8B:
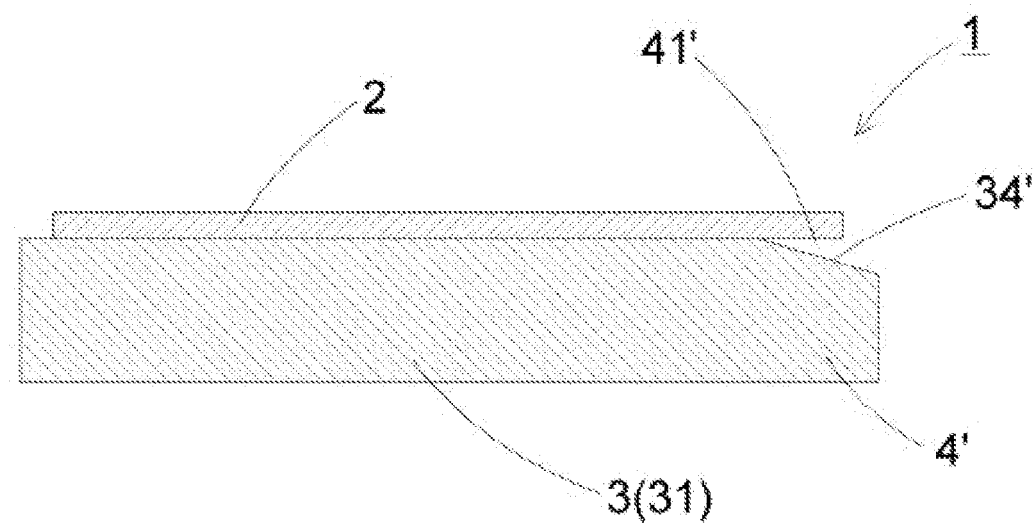
FIG. 8(b) is a sectional view taken along the line B-B of FIG. 8(a).

As long as the corner portion (22) of the glass film (2) may be distanced from the supporting member (3), the shape of the thin portion (4') is not particularly limited. For example, the thin portion (4') may be formed by providing a step as illustrated in FIG. 7(b). Further, it is preferred that, as illustrated in FIG. 8(b), the thin portion (4') be formed by providing an inclined portion (34') inclining downward toward the side (32). With this, at the time of peeling the glass film (2), when a peel-off sheet such as a PET film is inserted between the glass film (2) and the supporting member (3) from the clearance (41'), the inclined portion (34') serves as a guide for guiding the peel-off sheet, and hence the peel-off sheet can be easily inserted therebetween.

Figure 9A:
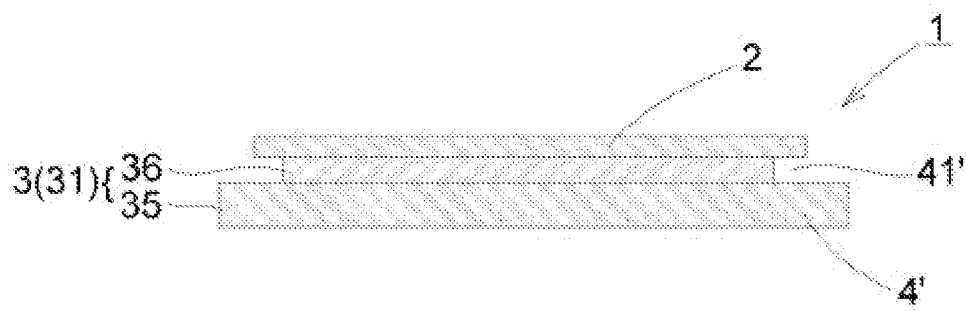
FIG. 9(a) is a sectional view illustrating further another embodiment in which a supporting member is formed of separated parted supporting members.

A method of forming the thin portion (4') is not particularly limited, and the thin portion (4') may be formed by polishing, grinding, sandblasting, etching, and the like. In particular, when a resin material such as PET or a metal is used for the supporting member (3), pressing may be performed to form the thin portion (4'). Further, the thin portion (4') may be formed by processing the supporting member (3) after the supporting member (3) is formed, or may be formed simultaneously when the supporting member (3) is formed. As illustrated in FIG. 9(a), the thin portion (4') may be formed by forming the supporting member (3) such that, onto a first parted supporting member (35), a second parted supporting member (36) slightly smaller than the first parted supporting member (35) is laminated to be fixed. In this case, it is preferred that the first parted supporting member (35) be slightly larger than the glass film (2), and the second parted supporting member (36) be slightly smaller than the glass film (2). With this, it is possible to easily provide the clearance (41') along a periphery of the glass film (2).

The thin portion (4') is preferably distanced from the glass film (2) within a width of 0.5 to 15 mm from the side (21) of the glass film (2). With this, the glass film (2) can be easily grasped, and further, it is possible to reduce influence of, for example, bending down of the glass film (2) due to a distance between the glass film (2) and the supporting member (3). When the distance width between the glass film (2) and the supporting member (3) is smaller than 0.5 mm, there is a possibility in that, when the glass film (2) is to be peeled, it becomes difficult to peel the glass film (2). On the other hand, when the distance width between the glass film (2) and the supporting member (3) is more than 15 mm, there is a possibility in that the glass film (2) is brought into contact with the thin portion (4'). It is more preferred that the thin portion (4') is distanced from the glass film (2) within a width of 1 to 10 mm from the side (21) of the glass film (2).

A distance h (see FIG. 7(b)) between the glass film (2) and the supporting member (3) at the thin portion (4') is preferred to be 0.01 mm or more. With this, by inserting a peel-off sheet such as a resin film from the clearance (41') between the supporting member (3) and the glass film (2) existing above the thin portion (4'), the glass film (2) can be easily peeled from the supporting member (3). When the distance h at the thin portion (4') is smaller than 0.01 mm, there is a possibility in that it becomes difficult to grasp the glass film (2). The distance h is preferred to be larger than the thickness of the peel-off sheet such as a resin film to be used when the glass film (2) is to be peeled. Meanwhile, considering the durability of the supporting member (3) and the like, the distance h at the thin portion (4') is preferably at most half the thickness of the supporting member (3), more preferably at most one-third the thickness of the supporting member (3).

Figure 9B:
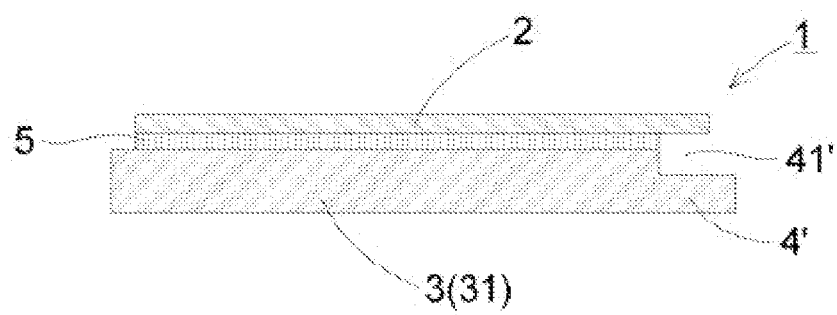
FIG. 9(b) is a sectional view illustrating still another embodiment in which an adhesive layer is provided between a supporting member and a glass film.

When the glass film laminate (1) is manufactured by laminating the glass film (2) onto the supporting member (3), as illustrated in FIG. 9(b), an adhesive layer (5) may be interposed between the glass film (2) and the supporting member (3). The glass film (2) is finally peeled off, and hence an adhesive having slight adhesion is preferably used for the adhesive layer (5). Specifically, the adhesive layer (5) preferably has an adhesive force of 0.002 to 2.00 N/25 mm, more preferably 0.005 to 1.00 N/25 mm, most preferably 0.01 to 0.7 N/25 mm.

After processing associated with manufacture, such as film formation, cleaning, and patterning, is carried out with respect to the glass film laminate (1) according to the present invention, the glass film (2) is peeled, starting from the thin portion (4'). When the peeling is performed, the corner portion (22) of the glass film (2) is grasped from the clearance (41') between the glass film (2) and the thin portion (4') with a finger or a grasping tool such as tweezers, and the glass film (2) is peeled from the supporting member (3). Alternatively, a peel-off sheet such as a resin film of, for example, a PET film may be inserted between the glass film (2) and the supporting member (3) from the clearance (41'), and with the corner portion (22) as a beginning end, the glass film (2) may be gradually lifted, to thereby peel off the glass film (2) from the supporting member (3). In the case where a resin film having flexibility is used for the supporting member (3), by folding the supporting member (3) in the vicinity of the thin portion (4') toward a side opposite to the glass film (2), the corner portion (22) of the glass film (2) can be easily grasped. The glass film (2) after being peeled off is incorporated into an electronic device or the like for various applications (for example, as a glass substrate for the electronic device).

Figure 10:
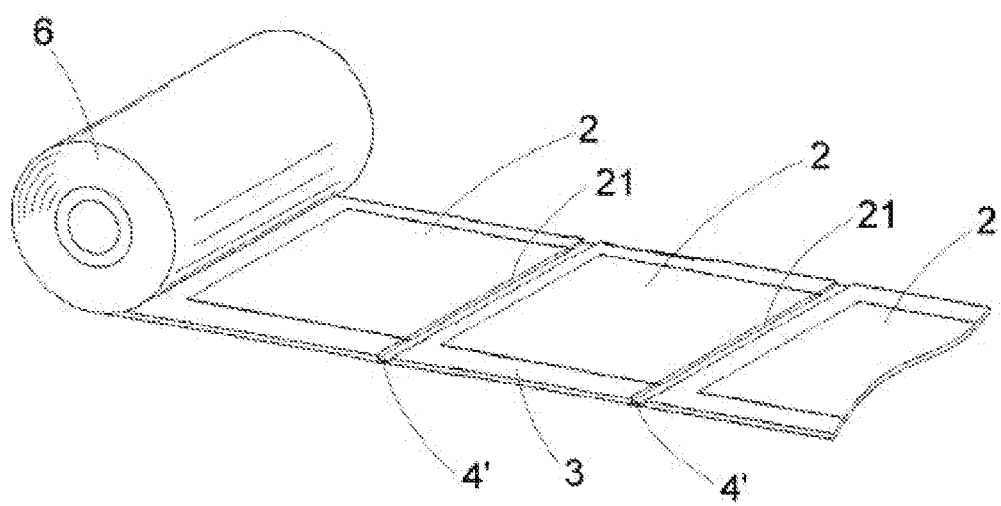
FIG. 10 is a view of a glass film laminate according to yet another embodiment of the present invention.
Figure 11:
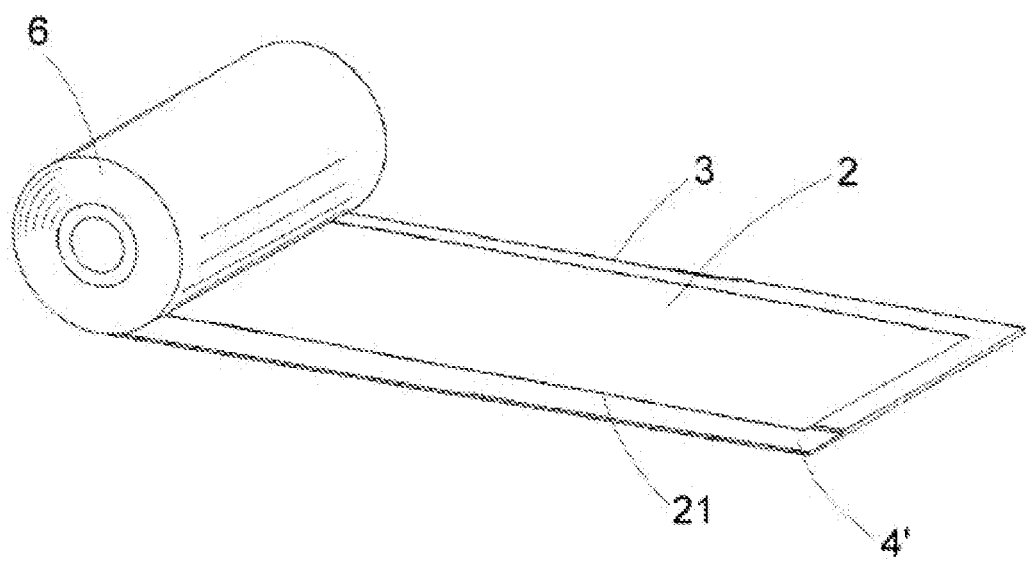
FIG. 11 is a view of a glass film laminate according to the yet another embodiment of the present invention.

FIGS. 10 and 11 illustrate the glass film laminate (1) according to further another embodiment of the present invention. In FIG. 10, the glass films (2) are intermittently laminated at predetermined lengths on the elongated supporting member (3) made of a resin film (PET film or the like), and the glass film laminate (1) is rolled to form a roll (6). With this, the transport efficiency of the glass film laminate (1) can be improved. Further, by employing a roll-to-roll process, the processing associated with the manufacture can be performed more efficiently. Directly below at least one side (21) of each of the glass films (2), the thin portion (4') is provided. As illustrated in FIG. 11, the glass film (2) may be continuously laminated on the supporting member (3), and the thin portion (4') may be formed continuously along the side (21) of the glass film (2).

INDUSTRIAL APPLICABILITY

The present invention can be suitably used for manufacturing a glass substrate to be used for devices such as a flat panel display including a liquid crystal display and an OLED display and a solar cell, and a cover glass for an OLED lighting device.

REFERENCE SIGNS LIST 1 glass film laminate
2 glass film
3 supporting member
31 supporting glass
32 side
4 peeling start portion
41 through hole
4' thin portion
5 adhesive layer
6 roll

The invention claimed is:

1. A glass film laminate, comprising a supporting member and a glass film laminated to each other, wherein:
   the supporting member is a supporting glass and protrudes from an entirety of all sides of a surface of the glass film facing the supporting member;
   the supporting member comprises a thin portion at which a thickness of the supporting member is partially reduced, the thin portion being provided at a side portion of the supporting member and extending to an edge of the supporting member;
   the glass film and the supporting member adhere to each other; and
   at least a part of a side of the glass film overlaps the thin portion of the supporting member and is distanced from the thin portion of the supporting member with a distance of greater than or equal to 0.01 mm, the at least the part of the side of the glass film being a portion from which the glass film is peelable off the supporting member.

2. The glass film laminate according to claim 1, wherein the thin portion is provided so that at least one corner portion of the glass film is distanced from the supporting member.

3. The glass film laminate according to claim 1, wherein the glass film is distanced from the supporting member within a width of 0.5 to 15 mm from the side of the glass film.

4. The glass film laminate according to claim 1, wherein the glass film has a thickness of 300 μm or less.

5. The glass film laminate according to claim 2, wherein the glass film has a thickness of 300 μm or less.

6. The glass film laminate according to claim 3, wherein the glass film has a thickness of 300 μm or less.

7. The glass film laminate according to claim 1, wherein each of the supporting member and the glass film is rectangular.

* * * * *